Aug. 3, 1965  E. V. MITCHELL  3,197,924
TWIST DRILL SHARPENER
Filed May 9, 1963  3 Sheets-Sheet 3
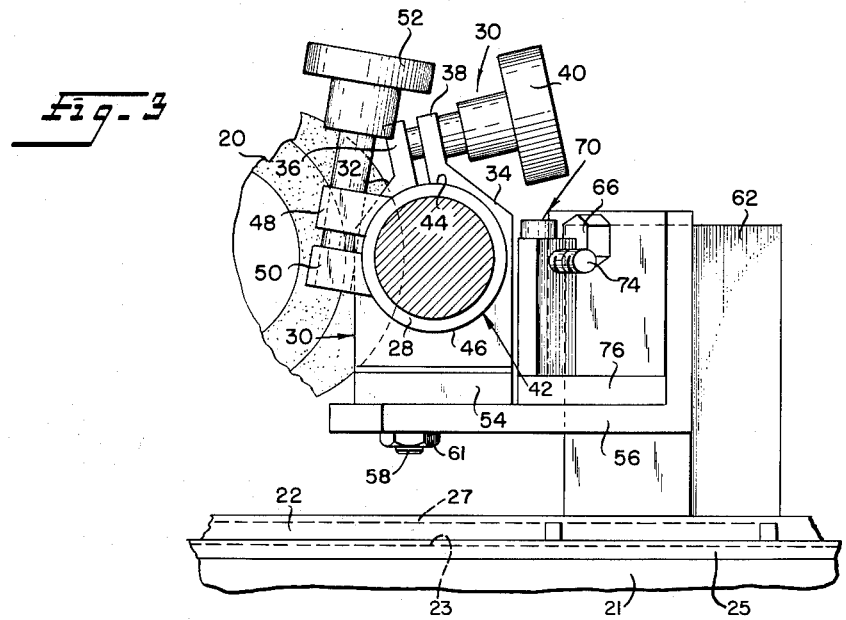
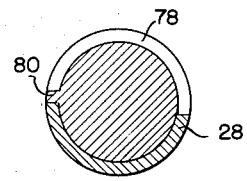
INVENTOR
*Ebb V. Mitchell*
BY
ATTORNEYS

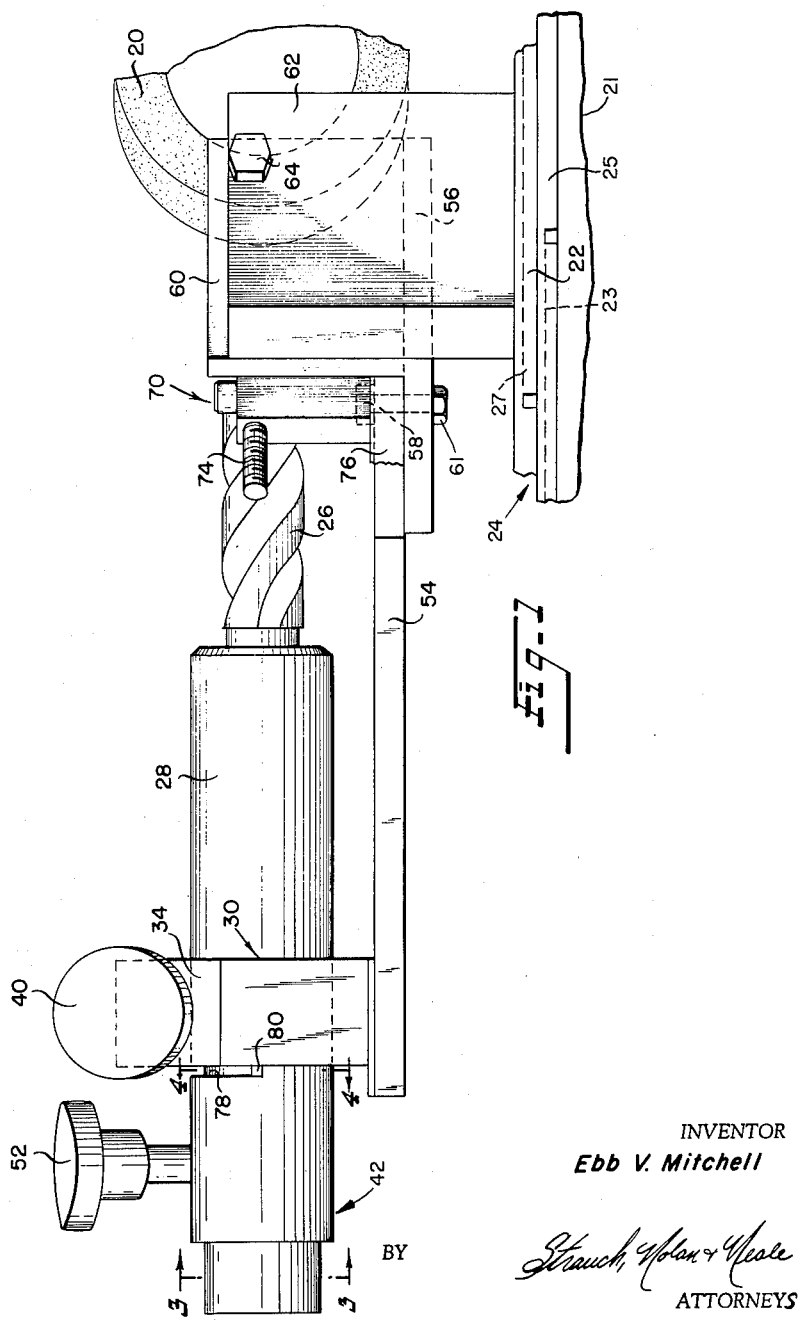

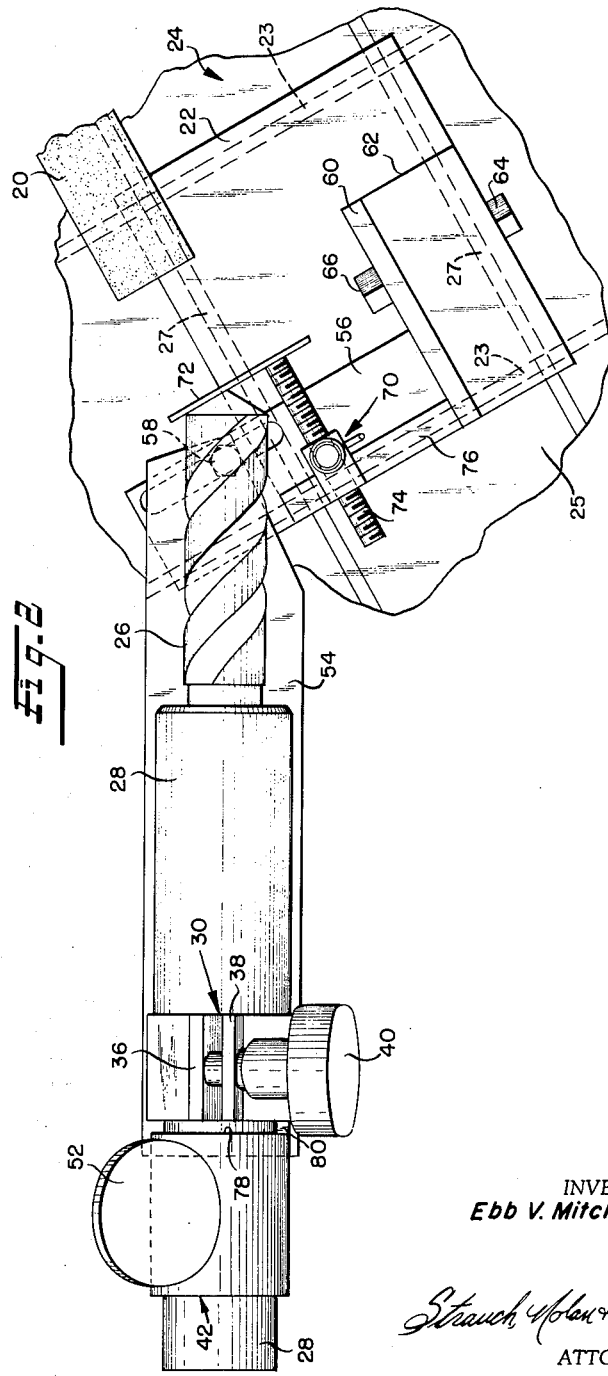

3,197,924
TWIST DRILL SHARPENER
Ebb V. Mitchell, Box 849, Midland, Tex.
Filed May 9, 1963, Ser. No. 279,273
2 Claims. (Cl. 51—219)

This invention relates to apparatus for sharpening tools and more particularly to such apparatus for sharpening or dressing twist drills or bits.

As is well known, the drilling effectiveness of a twist drill depends upon the sharpness and the contour of the point of the drill. While it is a relatively simple matter to obtain the required sharpness of the cutting edges it is extremely difficult to obtain the proper contour to provide the desired point angle and relief and to insure identity of the two cutting edges. If the two cutting edges are not identical, all of the cutting action is performed by one of the edges which produces an unbalanced load which results in rapid dulling of the drill or, when harder materials are encountered, results in breakage of the drill.

While apparatus has been developed for accurately sharpening or dressing the drill bits with the required degree of precision, nevertheless, the cost and complexity of such apparatus puts it far beyond the resources of the average small shop. Accordingly it has been common practice to dress or sharpen drill bits free hand, i.e., without the aid of any mechanical apparatus except a grinding wheel. This operation requires an extraordinary degree of skill and cannot in any event reproduce the original contour of the drill bit as it was manufactured. Accordingly, drill bits are often discarded when they become dull despite the obvious economic disadvantages of this practice.

With these considerations in mind, it is a principal purpose and object of the present invention to provide novel apparatus of simplified construction for dressing drill bits with a high degree of accuracy which is of simple construction and which accordingly may be manufactured and sold or rented at a cost well within the means of a small shop or a home owner.

It is a further object of the present invention to provide novel simplified apparatus for sharpening drill bits which is simple to set up and operate and which may be readily adjusted to produce substantially any desired point angle and relief on the drill bit with a high degree of accuracy.

In attaining these and other objects the present invention provides a chuck for holding a drill bit and a support for said chuck which guides the chuck for predetermined movement with respect to a grinder or a dressing wheel. The support and chuck mechanisms are constructed in a novel manner to permit quick initial set-up and to permit the sequential grinding of identical surfaces on the two cutting edges of the twist drill.

Additional object and advantages of the present invention will become apparent as the description proceeds in connection with the accompanying drawings in which:

FIGURE 1 is a side elevation of the drill sharpener constructed in accordance with the present invention;

FIGURE 2 is a top plan view of the apparatus of FIGURE 1; and

FIGURES 3 and 4 are transverse sections taken along lines 3—3 and 4—4 of FIGURE 1, respectively.

The apparatus of the present invention is used with a bench grinder of wholly conventional construction. Details of the grinder have been omitted except for fragmentary illustration of the dressing wheel 20. The apparatus of the present invention is carried by a base member 22 mounted on a slide mechanism 24 carried by a table or other support on which the grinder is mounted. The slide mechanism which is wholly conventional, includes a base 21 having slide guides 23 projecting into corresponding grooves in an intermediate plate 25 which in turn has slide guides 27 projecting into grooves in base member 22. Thus the mechanism is arranged to permit movement of the base member 22 and the components carried by the base in a plane parallel to the axis of the grinding wheel and in a direction normal to the axis of the grinding wheel 20 or in a direction parallel with that axis.

The twist drill 26 which is to be sharpened is detachably supported by a chuck 28, the internal configuration of which is conventional. The chuck 28 is provided with a carefully machined cylindrical surface to permit the chuck to be received for rotation and axial sliding movement in a collar 30. As best shown in FIGURE 3 the collar 30 is of split configuration and comprises a pair of arms 32 and 34, the free ends of which are provided with flanges 36 and 38. A clamping member 40 extends freely through the flange 38 and is threaded into the flange 36 to permit the chuck 28 to be firmly clamped or released by the collar 30.

A slidable collar 42, which encircles the chuck 28 outwardly of the collar 30, is provided with a pair of arms 44 and 46 having flanges 48 and 50, the former freely receiving a clamping member 52 threaded into the latter. Thus, when the clamping member 52 is released the movable collar is freely slidable or rotatable on the chuck 28. When the clamping member 52 is tightened the collar 42 is locked on the chuck 28 for movement therewith.

The collar 30 is rigidly supported on an arm 54 mounted on an intermediate support member 56 by a pivot pin 58. The pin 58 extends through a slot 59 in the intermediate base member 56 to permit the arm 54 to be swung in a horizontal plane about the axis of the pin. A nut 61 on the lower end of pin 58 may be tightened to lock the arm in any adjusted position as explained in detail below.

The intermediate support member 56 is provided with an upright flat flange 60 in surface contact with one flat side of a vertical post 62 rigidly carried by the support 22. A pin 64 extends horizontally through the upper portion of a post 62 and the upper portion of the flange 60 to support the latter for swinging movement about the axis of the pin 64. The parts are adjustably held together by a nut 66 threaded onto the inner end of the pin 64. In practice the nut 66 is adjusted so that the intermediate support 56 and the components carried thereby may be moved with relative freedom about the axis of pin 64 and yet will remain in any position to which they are moved.

When the mechanism is installed for use it is so located with respect to the grinding wheel 20 as to dispose the pivot pin 64 at substantially the level of, and parallel to, the axis of the wheel 20. The drill bit to be sharpened is then inserted into the chuck 28, which, in the form shown, is provided with a standard Morse taper to accommodate the taper on the shank of the drill bit. It is to be understood that a Jacobs chuck may be employed to accommodate smaller bits having cylindrical shanks. The parts are so dimensioned that the axes of relatively large bits, for example, one quarter inch and larger are disposed slightly (i.e., 1/16" to 3/16") below the axis of the pivot pin 64. Smaller bits may be positioned so as to locate their centers substantially at the level of the pivot pin 64.

Either before or after the bit to be sharpened is positioned in the chuck, the angle of the support arm 54 is adjusted with respect to the supporting member 56 to obtain the desired cone angle, which for most applications will be 118°. To achieve this cone angle the arm 54 is swung, after loosening the nut 61 on pin 58 to dispose the axis of the chuck 28 at an angle of 31° with respect to the direction of motion of the base 22, which, as stated above, is normal to the periphery of the grinding wheel. After this adjustment is made the nut 61 is securely tightened. To facilitate this adjustment the base member 56 may be provided with suitable indicia.

The amount of relief obtained in the grinding operation depends on the position of the point of the bit with respect to the pivot pin 64, the relief being reduced as a function of the distance the point of the bit projects ahead of the pin 64. A gauge assembly 70 is provided to facilitate the proper positioning of the bit to obtain the desired relief. The gauge assembly comprises an arm 72 carried by a rod 74 mounted for rotation and axial sliding movement in an upright flange 76 carried by the support member 56. The rod 74 carries suitable markings to permit it to be quickly moved to its desired position. With the gauge assembly in proper position the stationary and movable collars are loosened and the chuck 28 is advanced until the point of the bit contacts the gauge arm 72. The clamp member 40 is then tightened to fix the chuck 28 against axial movement and the gauge is removed. The sliding collar 42 is then moved against the adjacent face of the movable collar 30 and the clamping member 52 is tightened to lock the sliding collar in this position. It will be noted that the inner face of the sliding collar 42 is provided with a cut-away portion 78 which extends slightly more than 180° around the circumference of the sliding collar. A lug 80 carried by the fixed collar 30 projects into the cut-away portion 78 as best shown in FIGURES 1, 2 and 4. The dimensions of the cut-away 78 and the lug 80 are such that when the clamping member 52 is tightened and the clamping member 40 is loosened the chuck 28 may be rotated exactly 180° between limit positions determined by contact of the ends of the cut-away 78 with the lug 80.

When the slidable collar 42 is initially positioned it is moved so that the lug 80 is approximately halfway between the ends of the cut-away 78. With the parts in this position the clamping member 40 is loosened to permit rotation of the chuck 28 (without change of axial position) until one cutting edge of the bit 26 is exactly horizontal. The proper position of the bit may be determined by a suitable gauge. After the bit 26 has been properly positioned the clamping member 40 is again tightened to lock the chuck 28 agains rotation. The slidable collar 42 is then loosened and rotated until either end of the cut-away portion 78 contacts the lug 80 and the sliding collar is again re-tightened. The base is then advanced until the bit 26 contacts the dressing wheel 20. The entire mechanism is then swung about the axis of the pivot 64 to dress one side of the bit. This operation can be normally completed in one pass of the bit over the periphery of the dressing wheel 20. The clamping member 40 is then loosened and the chuck is rotated until the opposite end of the cut-away 78 contacts the lug 80. This action disposes the other cutting edge automatically in the proper position for the dressing operation which is then completed by swinging the apparatus again about the axis of the pivot 64. The drill bit, which is then ready for use, is then removed from the chuck 28.

Despite its simplicity the mechanism assures accurate grinding of both cutting edges of the drill with exactly the same angle and with exactly the same degree of relief. The effectiveness of the dressing operation is entirely independent of the skill of the operator who only need be familiar with the set-up procedure.

While, as stated above, the cone angle and the relief can be varied readily as required it will not normally be necessary to make such adjustments since in most cases the cone angle and the relief will be the same for all drills used in a particular shop. Accordingly, an operator having any degree of familiarity with the mechanism can sharpen a drill to standard configuration in less than a minute and yet be assured of completely accurate results.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for supporting a twist drill for grinding by a grinding wheel mounted for rotation on a predetermined axis comprising a base mounted for lateral bodily shifting movement toward and away from the periphery of said wheel in a plane substantially parallel with the axis of said wheel, a support member mounted on said base for pivotal movement about an axis fixed with respect to the support member, said axis being parallel to the axis of said wheel and at substantially the same elevation as the axis of said wheel, an arm carried by said support member, said arm being swingable about an axis essentially normal to the pivotal axis of said support member, a chuck adapted to releasably carry a twist drill coaxially thereof, a first collar rigid with said arm for supporting said chuck for rotation about an axis parallel to said arm and for movement axially of said arm with respect to said first collar, means for clamping said chuck in said first collar in predetermined axial and rotated position to position said drill to be ground by said wheel when said chuck, arm and support member are swung about the pivotal axis of the latter, a second collar carried solely by said chuck for free rotation and axial movement on said chuck, means for clamping said second collar in predetermined adjusted position on said chuck, and cooperating means on said first and second collars to permit said chuck to be rotated within said first collar to predetermined angularly related position, 180° apart.

2. Apparatus supporting a twist drill for grinding by a grinding wheel mounted for rotation about a predetermined axis comprising a base mounted for bodily shifting movement toward and away from the periphery of said wheel in a plane substantially parallel with the axis of said wheel, a chuck supporting arm, means mounting said chuck supporting arm for compound pivotal movement about a fixed axis parallel to the axis of said wheel and at substantially the same elevation as the axis of said wheel and a second axis normal to said fixed axis, a chuck adapted to releasably carry a twist drill coaxially thereof, a first collar rigid with said arm for supporting said chuck for rotation about an axis parallel to the axis of said arm and for movement axially of said arm and axially of said first collar, means for releasably clamping said first collar to hold said chuck in predetermined position or to release said chuck for movement, a second collar carried solely by said chuck for free rotation and axial movement on said chuck, means for clamping said second collar in predetermined position on said chuck, and cooperating means on said collars for rotating said chuck 180° after one cutting surface on said twist drill has been ground to permit the identical grinding of the other cutting surface on said twist drill.

(References on following page)

References Cited by the Examiner

UNITED STATES PATENTS

| | | | |
|---|---|---|---|
| 299,433 | 5/84 | Smith | 51—219 X |
| 388,784 | 8/88 | Mossberg | 51—219 |
| 389,095 | 9/88 | Mossberg | 51—219 |
| 864,546 | 8/07 | Lange | 51—219 |
| 1,195,248 | 8/16 | Mallory | 51—219 |
| 1,674,224 | 6/28 | Rabut | 51—219 |
| 2,369,642 | 2/45 | Benning | 51—219 |
| 3,039,244 | 6/52 | Vickerman | 51—219 |

FOREIGN PATENTS

| | | |
|---|---|---|
| 548,590 | 4/32 | Germany. |
| 834,335 | 3/52 | Germany. |
| 1,072,501 | 12/59 | Germany. |
| 1,111,053 | 7/61 | Germany. |

LESTER M. SWINGLE, *Primary Examiner*.

J. SPENCER OVERHOLSER, *Examiner*.